Figure 1:
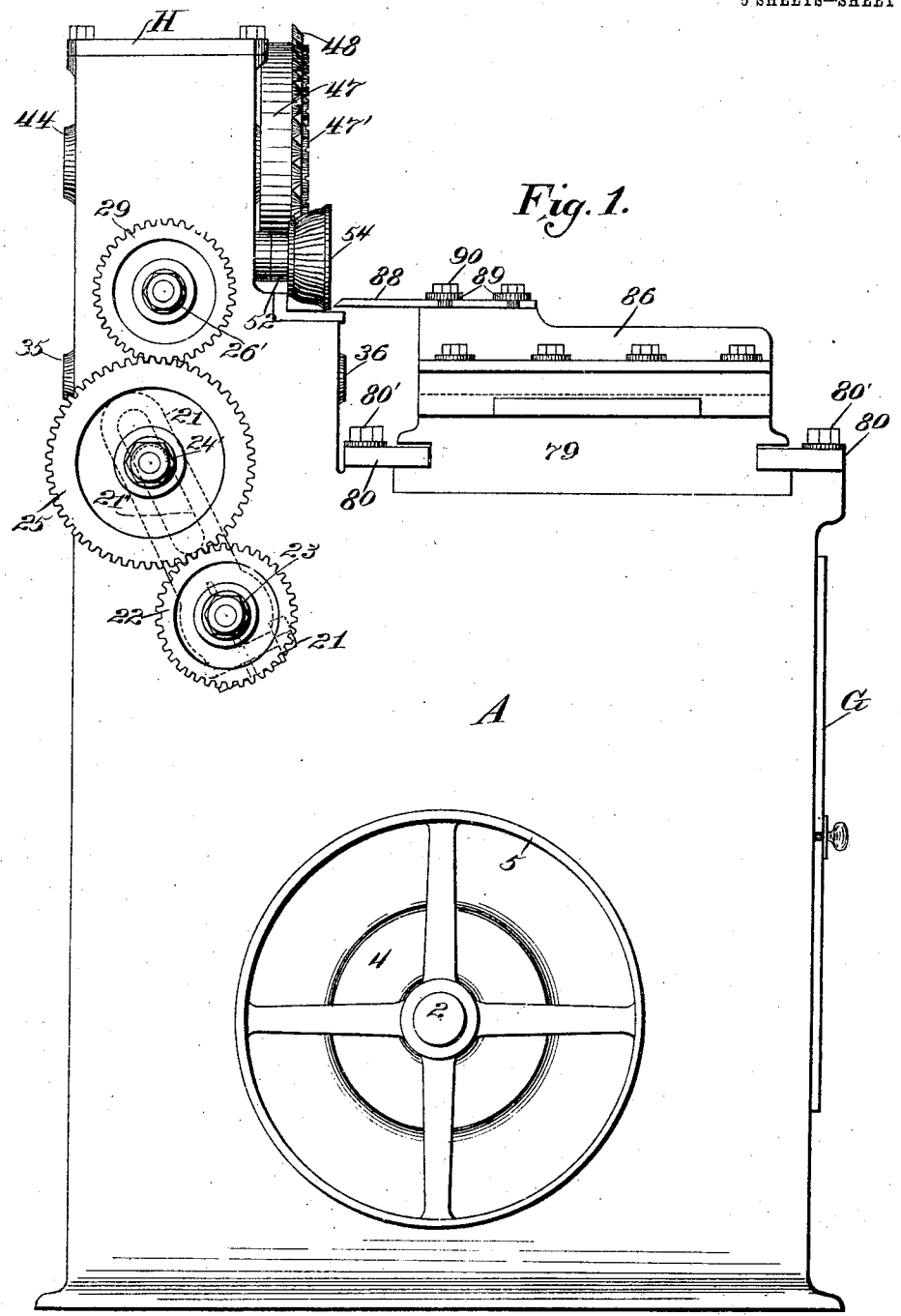

No. 861,538. PATENTED JULY 30, 1907.
F. H. RICHARDS.
CARVING MACHINE.
APPLICATION FILED SEPT. 9, 1902.

5 SHEETS—SHEET 1.

Witnesses
E. A. Jarvis.
Marcus C. Hopkins

Inventor
F. H. Richards

No. 861,538. PATENTED JULY 30, 1907.
F. H. RICHARDS.
CARVING MACHINE.
APPLICATION FILED SEPT. 9, 1902.

5 SHEETS—SHEET 2.

Witnesses
C. A. Jarvis.
Marcus C. Hopkins

Inventor
F. H. Richards

No. 861,538.
PATENTED JULY 30, 1907.
F. H. RICHARDS.
CARVING MACHINE.
APPLICATION FILED SEPT. 9, 1902.
5 SHEETS—SHEET 3.
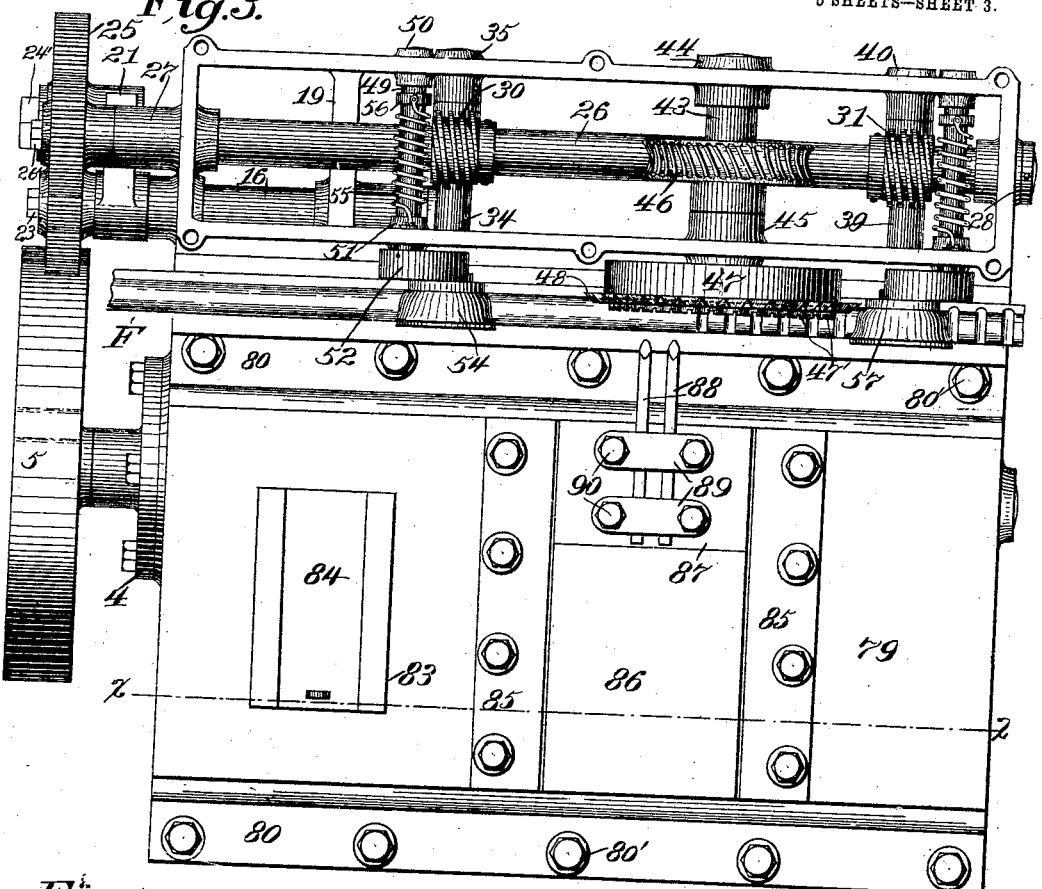
Fig. 3.
Fig. 10.
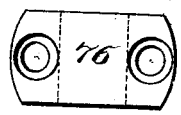
Fig. 11.
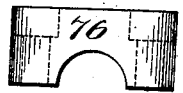
Fig. 12.
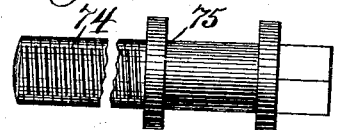
Fig. 13.
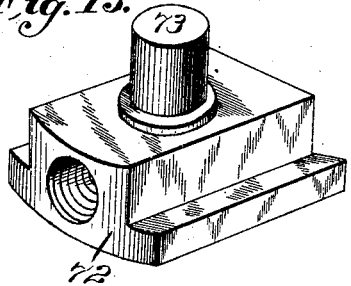
Fig. 14.
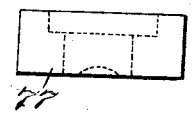
Fig. 15.
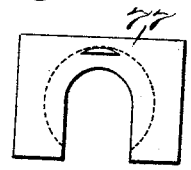
Witnesses
C. A. Jarvis.
Marcus Hopkins
Inventor
F. H. Richards.

No. 861,538. PATENTED JULY 30, 1907.
F. H. RICHARDS.
CARVING MACHINE.
APPLICATION FILED SEPT. 9, 1902.

5 SHEETS—SHEET 4.

Witnesses
C. A. Jarvis
Marcus C. Hopkins

Inventor
F. H. Richards

No. 861,538.
PATENTED JULY 30, 1907.
F. H. RICHARDS.
CARVING MACHINE.
APPLICATION FILED SEPT. 9, 1902.
5 SHEETS—SHEET 5.
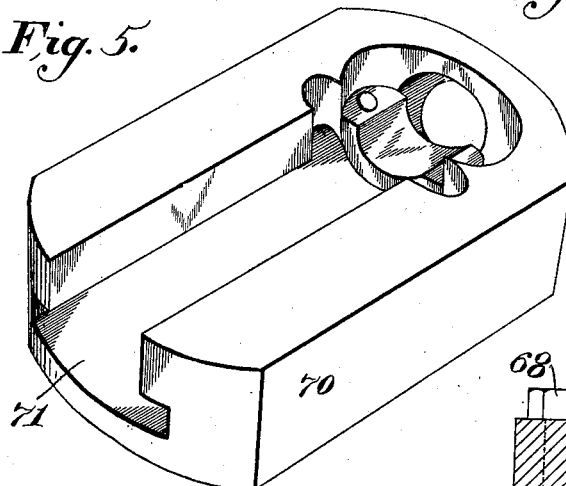
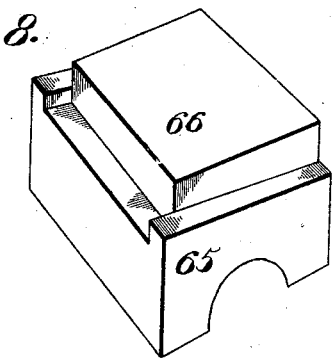
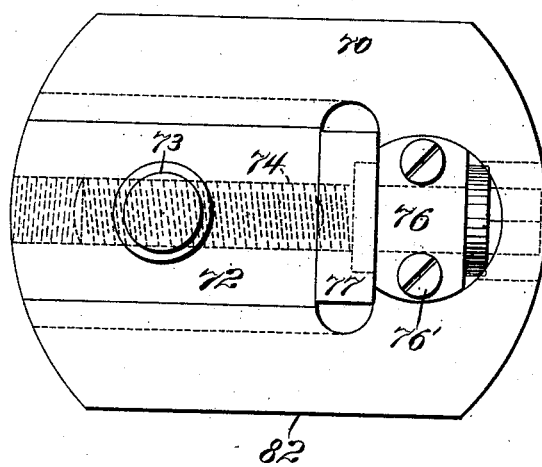
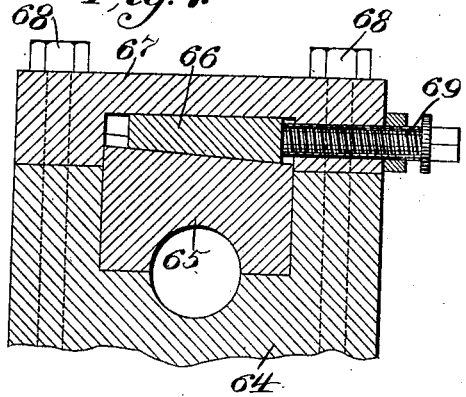
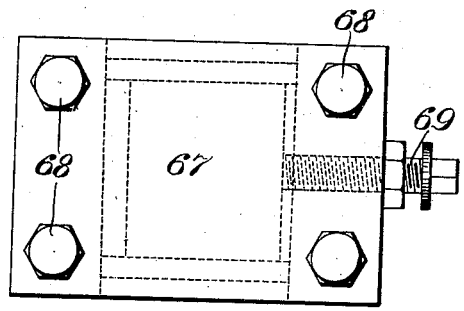
Witnesses
C. A. Jarvis.
Marcus C. Hopkins
Inventor
F. H. Richards.

UNITED STATES PATENT OFFICE.

FRANCIS H. RICHARDS, OF HARTFORD, CONNECTICUT.

CARVING-MACHINE.

No. 861,538.

Specification of Letters Patent.

Patented July 30, 1907.

Application filed September 9, 1902. Serial No. 122,677.

*To all whom it may concern:*

Be it known that I, FRANCIS H. RICHARDS, a citizen of the United States, residing at Hartford, in the county of Hartford and State of Connecticut, have invented certain new and useful Improvements in Carving-Machines, of which the following is a specification.

My present invention pertains to the organization of machinery for the production of carved moldings or analogous work and relates to a machine built for the above named purposes in which the operating tools are carried with the continuously moving stock during their operation thereon, that is, during the period that said tools are within the path of movement of the stock.

This invention consists in novel and useful mechanical organizations whereby a portion of the tools of a carving machine are carried at varying speed with a variably moving stock during their operation upon the stock and in which such a construction is combined with a rotary cutter having a variable angular velocity in a compact device of practical design and mechanical perfection embodying structural characteristics peculiarly adapted to the ordinary environment of a machine of this class, and further consists in novel and useful elements and combinations of elements as hereinafter set forth and claimed.

Heretofore the intermittent feed and intermittently operating cutters have been used, as well as a uniform feed and a movement of the cutters with the stock during their operation thereon but I have in the present invention employed a continuous but variable feed and devised mechanism for moving cutters with the stock at varying velocities substantially coincident with those of the stock during the operation of the cutters upon the stock and combined therewith a rotary cutter for making the short cuts and driven at the same varying velocities as are imparted to the feed of the stock.

By the employment of both the variable feed and variable movement of the traveling cutters I have produced an organism in which the resistance presented to the driving power is very evenly distributed throughout the cycle of the machine, and the strains are also distributed with a view to maintaining an equilibrium of the machine during its operation thereby permitting high speed, and consequent increase in production, and the absence to a great extent of jarring and pounding.

Some of the objects of my invention are to provide a continuous-feed carving machine; to provide mechanism wherein the tools may be operated in conjunction with the feed and coöperate to a nicety; to provide a mechanical organization of this class wherein the resistance by reason of the continuous nature of the movement is more evenly distributed and the machine rendered capable of operation at high speed 
without deleterious results; and to provide such a machine wherein those portions of the mechanism subject to corruption or destruction or dangerous to operatives shall be protected and preserved or guarded as the case requires.

I have illustrated one embodiment of my invention in a carving machine in the drawings forming part of this specification, in which like reference characters refer to like parts throughout the several views.

Figure 2:
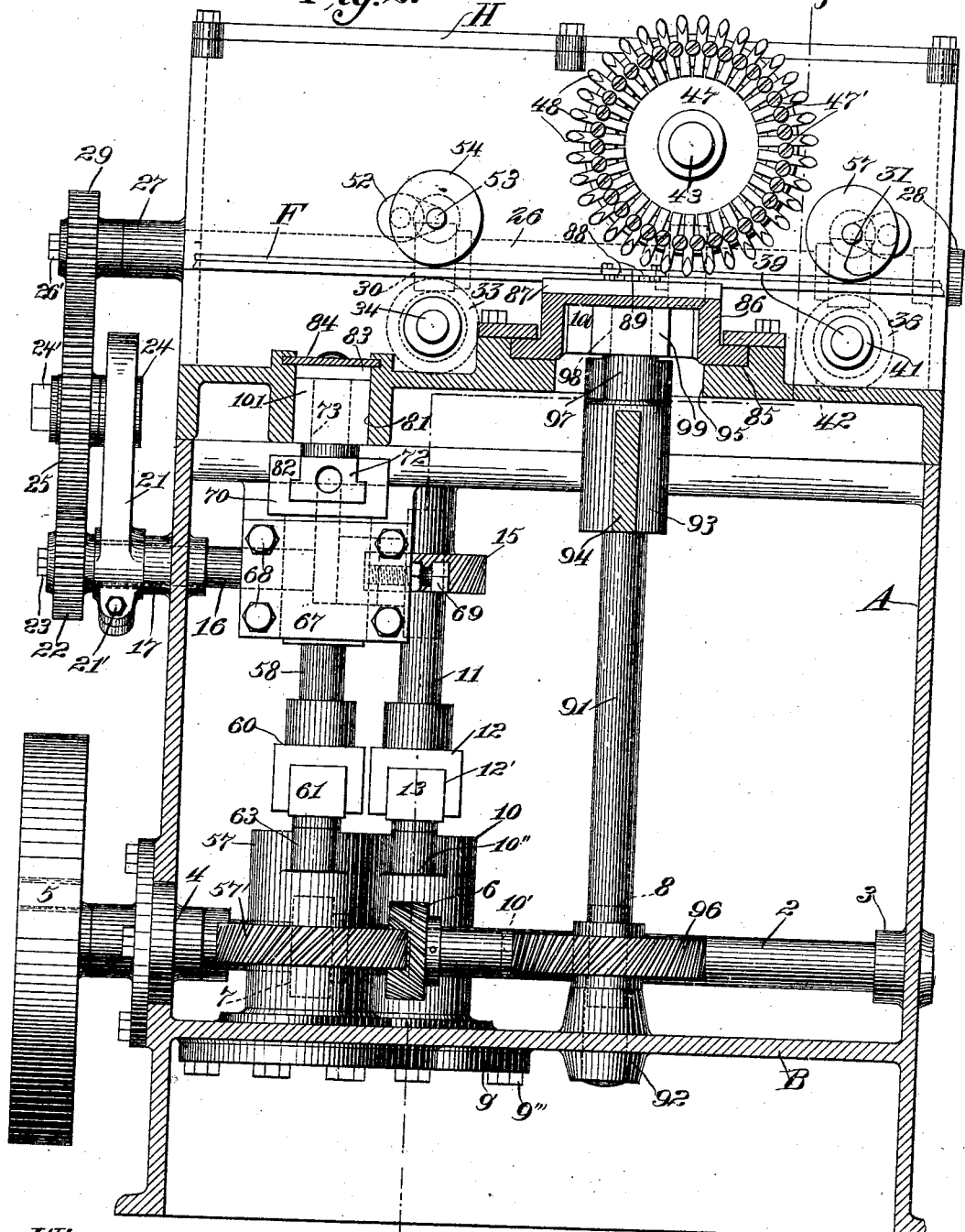
Figure 4:
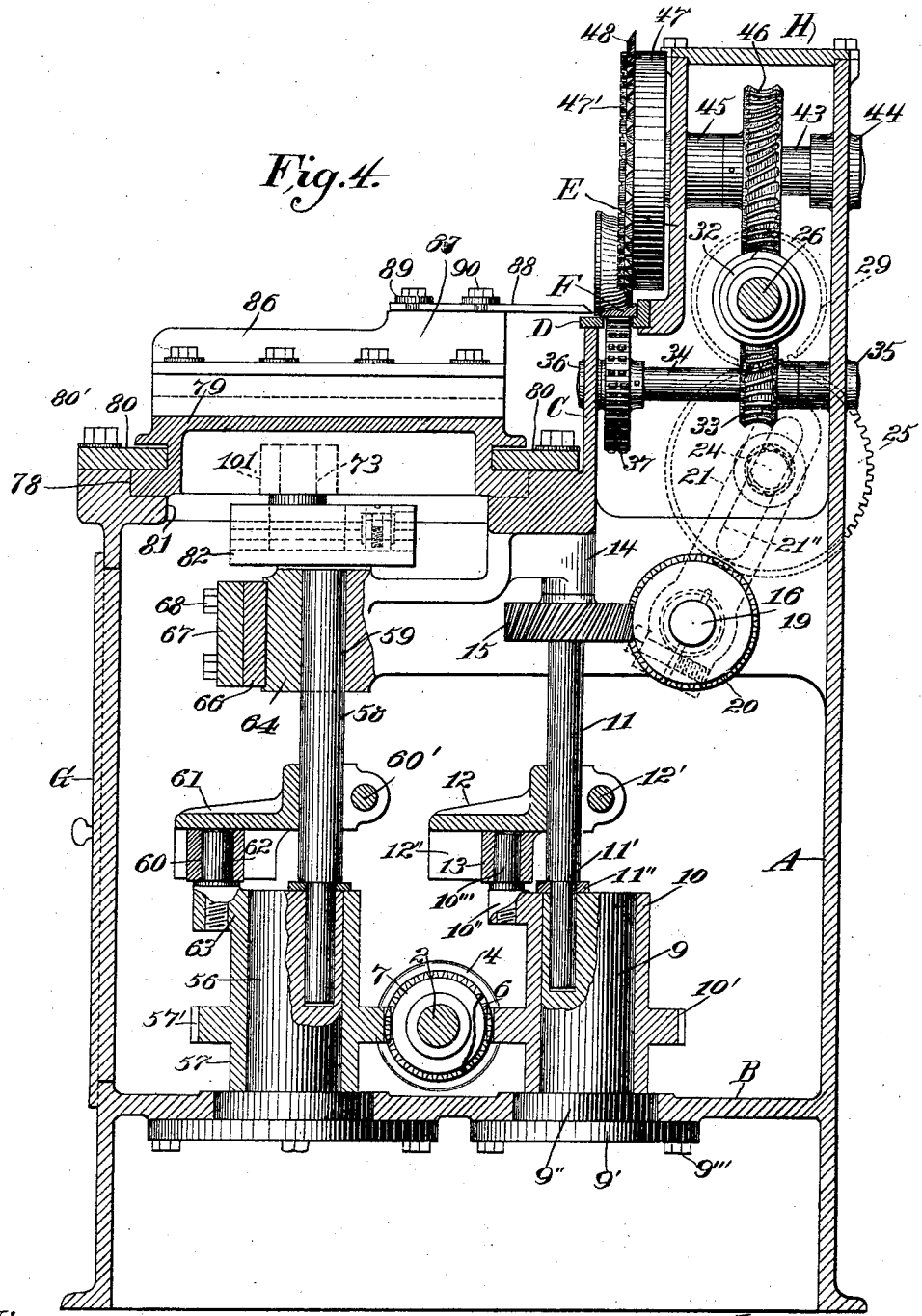

Figure 1 is a front elevation; Fig. 2 is a vertical longitudinal section on line $x-x$, of Fig. 3 looking from right to left of the machine; Fig. 3, a plan view; Fig. 4, a vertical cross section on line $y-y$ of Fig. 2; Fig. 5, a detail in perspective of the carrier driving adjustable crank body; Fig. 6, a plan view of the carrier driving adjustable crank; Fig. 7, a cross section of the carrier driving shaft journal bearing; Fig. 8, a detail in perspective of the journal box and gib of the device shown in Fig. 7; Fig. 9, a side view of the device of Fig. 7; Figs. 10 and 11 respectively, plan and side elevations of the adjusting screw bearing of the carrier driving adjustable crank; Fig. 12, a detail of the adjusting screw of the carrier driving adjustable crank; Fig. 13, a detail in perspective of the wrist pin and slide of the carrier driving adjustable crank, and Figs. 14 and 15 respectively, plan and side elevations of a spacing block for the adjustable crank.

Referring to the drawings, the machine illustrated is mounted and assembled upon a box-like frame A. The frame A has a bottom B raised somewhat from the foot of the machine. In the bottom B two circular apertures of considerable size are provided.

A horizontal driving shaft 2 is mounted longitudinally of the frame A in a bearing 3 in one end wall of the frame, and a bushing bearing 4 in the other end wall of the frame, and projects without the front wall accommodating upon said projecting portion, a fast driving pulley 5. Three spiral gears 6, 7 and 8 of like diameter and pitch are mounted fast upon the driving shaft 2 within the frame A, and it is in order that these spiral gears may be fixed upon the driving shaft 2 before the same is put in place within the frame that the bushing bearing 4 is provided, the aperture in the front wall of the frame A filled by the bushing bearing 4 being of greater diameter than that of the spiral gears 6, 7 and 8.

In one of the circular apertures in the bottom B of the frame A is mounted a stud 9. The stud 9 is provided with a flange 9' upon its lower end and an enlarged cylindrical portion 9'' next thereto which cylindrical portion 9'' is adapted to fit the aperture in the bottom B, while the flange 9' is adapted to abut the under surface of the bottom B and be bolted thereto by machine screws or bolts 9''', securely fastening the stud 9 in an upright position in the bottom B. The stud 9 is quite large and about the same is mounted a sleeve 10 to rotate upon said stud and bear upon the shoulder formed by the cylindrical portion 9″. Cast with or otherwise fixed to the sleeve 10 is a spiral gear 10′ of twice the diameter of and which meshes with the spiral gear 6 upon the driving shaft 2. Cast or otherwise fixed to the sleeve 10 at one side of its top is a crank portion 10″ which carries a wrist pin 10‴. A longitudinal bore is formed in the upper end of the stud 9 eccentric therewith, the stud 9 being of so great diameter as to admit of a considerable degree of eccentricity of the said bore. A perpendicular shaft 11 is mounted in the said bore in the upper end of the stud 9 and has a shoulder 11′ which bears upon a washer 11″; which in turn bears upon the top face of the stud 9, securing a free rotation of the shaft 11 in the said bore. A crank 12 is secured to the shaft 11 through the medium of its split hub and clamping bolt 12′, and is provided upon its under surface with a radial guideway 12″ on which a box 13 mounted upon the wrist pin 10‴ on the sleeve 10 is adapted to slide. It will then be seen that upon the rotation of the driving shaft 2 the spiral gear 6 will drive the sleeve 10 through the spiral gear 10′ at one-half the speed of the driving shaft 2 and that the wrist pin 10‴ upon the crank portion of the sleeve 10 will drive the shaft 11 through the crank 12, but as the shaft 11 is mounted eccentric to the axis of the sleeve 10 the wrist pin 10‴ in driving the crank 12 in a complete revolution will slide in the radial guideway 12″ effecting a varying of the radius of the crank 12, and consequently effecting varying velocities in the shaft 11 while said shaft 11 completes one revolution with the completion of one revolution by the sleeve 10. The split hub of the crank 12 and its clamping bolt 12′ admits of the ready adjustment of the crank 12 upon the shaft 11. The upper end of the shaft 11 is confined by a bearing 14 depending from a portion of the inclosing top of the frame A, and upon said shaft 11 directly beneath the bearing 14 is mounted fast a spiral gear 15.

A horizontal shaft 16 is mounted longitudinally of the frame A in a bearing 17 in the front wall of the frame A, and a bearing 18 in a transverse web 19 of the frame A. A spiral gear 20 is mounted fast upon the shaft 16 and is of the same diameter and meshes with the spiral gear 15 on the shaft 11. The shaft 16 projects without the front wall of the frame A. Upon a projection of the bearing 17 is mounted a radial arm 21, the hub of said radial arm 21 being split and provided with a clamping bolt 21′ to admit of its ready angular adjustment upon the hub 17. Upon the projecting end of the shaft 16 a spur gear 22 is secured by a securing screw 23. The spur gear 22 forms one of a number of change gears and may be substituted by other gears of different diameters by removing the securing screw 23, removing the gear 22, substituting the other and securing the same by the screw 23. The arm 21 is provided with a radial slot 21″ in which slot 21″ a stud 24 may be secured at any point by a securing screw 24′. An idle change spur gear 25 is mounted loose upon the stud 24 and secured thereon by the screw 24′ at the same time that the stud 24 is secured in the slot 21″, the slot 21″ admitting of the mounting of spur gears of different diameter in mesh with the spur gear 22. A horizontal shaft 26 is mounted longitudinally of the frame A in bearings 27 and 28 in the front and rear walls of the frame A, and projects without the front wall of the frame A. A change gear 29 is secured upon the projecting end of the shaft 26 by a securing screw 26′. The change gears 25 of different diameter may be brought into mesh with the change gear 29 by the angular adjustment of the arm 21 upon the hub of the bearing 17. Three worms 30, 31 and 32 are mounted fast upon the shaft 26. The worm 30 meshes with a worm wheel 33 fast upon a horizontal shaft 34 mounted transversely of the frame A in a bearing 35 in the left side wall of the frame A, and a bearing 36 in a rising portion C of the inclosing top of the frame A. A feed roll 37 is mounted fast upon the shaft 34 adjacent to bearing 36 and its periphery extends through and slightly above the floor of the horizontal stock guide D mounted longitudinally of the frame A and forming a horizontal portion of the inclosing top of the frame A next above the rising portion C. The worm 31 meshes with the worm wheel 38 fast upon the horizontal shaft 39 mounted transversely of the frame A in a bearing 40 in the left side wall of the frame A, and a bearing 41 in a rising portion C of the inclosing top of the frame A. A feed roll 42 is mounted fast upon the shaft 39 adjacent to bearing 41 and its periphery extends through and slightly above the floor of the horizontal stock guide D. The shafts 34 and 39 both pass under the shaft 26, the worm wheels 33 and 38 meshing with the under sides of their respective worms.

A horizontal shaft 43 is mounted transversely of the frame A in a bearing 44 in the eft side wall of the frame A and a bearing 45 in a rising portion E of the inclosing top portion of the frame A next above the stock guide D and projects without the rising portion E. A worm wheel 46 is mounted fast on the shaft 43 and meshes with the upper side of the worm 32. Upon the projecting portion of the shaft 43 is mounted fast a rotary tool head 47, provided with radially directed tools 48 secured to said head by screws 47′. The active periphery of the rotary cutter formed by the tool head 47 and the tools 48, which is about upon the line of the cutting edges of the tools, is made of considerable length, that is, I have deemed it expedient to make the diameter of the rotary cutter as large as possible within the limits of the design of the particular machine.

It will be seen that the shaft 26 drives the feed rolls 37 and 42 in the opposite direction to that in which it drives the rotary cutter. The periphery of the rotary cutter approaches the floor of the stock guide D from above. The worm wheels 33 and 38 and the worm wheel 46 are proportioned to the diameters of the feed rolls and the rotary cutter in such manner that the velocities of the active peripheries of the feed rolls and the rotary cutter shall be the same.

It will now be seen that through the train of gearing described the uniform rotation of the driving shaft 2 is imparted to the feed rolls and the rotary cutter in opposite directions at coincident varying velocities. I have illustrated a piece of stock F lying in the stock guide D, and by the mechanism described the said stock would be fed along said stock guide by the feed rolls, and at the same time the rotary cutter would be rotated in the opposite direction so that its active periphery would travel with coincident velocities with and within the profile of the said stock.

A horizontal shaft 49 is mounted transversely of the frame A in a bearing 50 in the left side wall of the frame A and a bearing 51 in the rising portion E and projects without said rising portion E. On the projecting portion of shaft 49 a crank 52 is rigidly mounted, said crank 52 carrying a wrist pin 53 upon which wrist pin 53 a presser roll 54 is loosely mounted. The presser roll 54 is adapted to press upon the stock F directly above the feed roll 37. A spring 55 is coiled about the shaft 49, one end being connected to a collar 56 fast on said shaft 49, and the other end being connected to the rising portion E of the frame A. The action of the spring 55 is to press the presser roll 54 upon the stock directly above the feed roll 37 thereby insuring a firm grip of the stock by the said feed roll 37. A presser roll 57 is mounted in identically the same manner as is presser roll 54, and presses upon the stock directly above the feed roll 42.

A stud 56 is mounted in the other aperture in the bottom B of the frame A in identically the same manner as the stud 9 is mounted. The stud 56 is provided with a longitudinal bore similar to that of stud 9, which bore is eccentric to the axis of said stud 56 in the same degree as that of stud 9. The bores in the studs 9 and 56 however, while being eccentric in the same degree to the axes of their respective studs are not placed in the same relative positions, but one is given an advance of 180 degrees over that of the other, so that said bores are set at opposite positions relative of the axes of the studs 9 and 56. Upon the stud 56 is mounted a sleeve 57 similar to the sleeve 10, which sleeve 57 is provided with a spiral gear 57′ which meshes with spiral gear 7 on the driving shaft 2.

It will be noticed that the studs 9 and 56 are upon opposite sides of the driving shaft 2, and as all of the spiral gears are right hand gears, the sleeve 57 will be driven in the opposite direction to that of sleeve 10. The gear 57′ is twice the diameter of the gear 7 and therefore the sleeve 57 will be driven at ½ the speed of the driving shaft, or at the same speed as that of sleeve 10. A shaft 58 is mounted in the bore of stud 56 in the same manner as shaft 11 is mounted and its upper end is confined in a bearing 59 on the web 19 of the frame A. A crank 60, similar to the crank 12 is mounted on the shaft 58 in the same manner as crank 12 is upon shaft 11 and is provided with a split hub and clamping bolt 60′, and accommodates in its radial guideway a box 61 which is mounted upon the wrist pin 62 of the crank portion 63 of the sleeve 57. The shaft 58 is driven from the driving shaft 2 at the same varying velocities as the shaft 11, but as the shaft 58 is set upon the opposite side of the axis of its driver to that of the shaft 11, the coincident velocities occur at relatively opposite points in the rotation of said shafts, and said shafts rotate in opposite directions. The adjustable bearing 59 consists of a body part 64 identical with the web 19 and a bearing block 65 which sets into the body part 64. See Fig. 7. The outside surface of the bearing block is inclined and a wedge gib 66 bears thereon. A gib 67 is bolted upon the body part 64 by bolts 68, and its inner surface is adapted to abut the outer surface of the wedge gib 66. An adjusting screw 69 is threaded into the gib 67 and serves to move the gib 66 in or out to force the bearing block 65 against the shaft to take up wear.

An adjustable crank 82 is mounted fast on the shaft 58 in the present illustration shown just above the bearing 59 and consists of a body portion 70 which is fixed rigidly to the shaft 58 and which is provided with a radial T-slot 71 in its upper surface; a slide block 72 mounted in said T-slot 71 and carrying a wrist pin 73; and an adjusting screw 74 threaded in said sliding block and having an annular groove 75 which is engaged by a clamp 76 secured to the body portion 70 by screws 76′. It will be seen that the wrist pin 73 can be carried any distance from the axis of shaft 58 by screwing the adjusting screw 74 to the right or left which by means of the threaded portion moves the sliding block 72 in the T-slot 71. As the positions or relative distances from the axis of shaft 58 which the wrist pin 73 will assume in the adjustments of the machine are to be ascertained and thereafter be fixed for the several adjustments of the machine, I have provided spacing blocks 77 of different thicknesses corresponding to the different distances between the sliding block 72 and the clamp 76 at different required positions, which spacing blocks 77 are made in the form of yokes which may be slipped over the adjusting screw 74 and said adjusting screw manipulated until the sliding block is moved to grip the spacing block tightly between its end and the clamp 76 when the required adjustments will be had.

Guideways 78 are formed in the upper inclosing surface of the frame A parallel with the stock guide D, in which guideways 78 a carrier 79 is mounted to slide longitudinally of the machine. The carrier 79 is secured in the guideways 78 by gibs 80 bolted to the frame A by bolts 80′. An aperture 81 is provided in the inclosing top of the frame A directly above the adjustable crank 82 and between the guideways 78. The aperture 81 is of greater diameter than the greatest throw of the adjustable crank 82. A guideway 83 is formed in and transversely of the carrier 79 and is in the form of a slot passing entirely through the said carrier 79. A sliding block 101 is mounted in the guideway 83 on which block the wrist pin 73 of adjustable crank 82 is journaled. As the guideway 83 forms an aperture in the carrier 79 access may be had to the adjustable crank 82 therethrough. A sliding cover 84 forms a closure for the aperture formed by the guideway 83 and renders the same dust tight. It will be seen that upon the rotation of the shaft 58 the carrier 79 will be reciprocated by the adjustable crank 82 through the yoke connection formed by the guideway 83.

I have employed in the present machine the principle set forth in my application No. 116,759 filed July 24, 1902, which principle as applied in the present case consists in utilizing the development of one variable speed transmitting mechanism which produces velocities in stock, for instance, driven thereby substantially coincident with the velocities of a member driven by the diametral movement of another variable speed transmitting mechanism. The feed rolls and rotary cutter in the present case are driven by one variable speed mechanism from the development of the same, while the carrier 79 is driven by the diametral movement of the other variable speed transmitting mechanism, therefore, as the variable speed transmitting mechanisms are constructed and timed in accordance with the principle set forth in the above-mentioned application, the carrier 79 in its movement in the same direction as that taken by the stock F, will travel with said stock at substantially coincident velocities, thereby maintaining a substantial fixed relation between said moving stock and said moving carrier during the movement of said carrier in the direction of the movement of said stock.

Transverse guideways 85 are provided upon the upper surface of the carrier 79 transverse of said carrier, and a tool carriage 86 is mounted therein to slide transversely of the carrier 79. The tool carriage 86 has a tool bed 87 slightly above the level of the floor of the stock guide D upon which tool bed 87 tools 88, two in number in the present instance, are clamped by clamps 89 secured to the tool bed 87 by machine screws 90. A vertical shaft 91 is mounted in a bearing 92 in the bottom B of the frame A, and a bearing 93 in a web 94 of the frame A, and projects upwardly through an aperture in the inclosing top of the frame A and an aperture 95 in the carrier 79 between the guideways 85, which aperture 95 is of such diameter as to accommodate the shaft 91 throughout the movement of the carrier 79. A spiral gear 96 is mounted fast on the shaft 91 and meshes with and is of twice the diameter of the spiral gear 8 of the driving shaft 2. A crank 97 is mounted on the upper end of shaft 91 above the bearing 93 which carries a wrist pin 98 upon which is mounted a box 99 which slides in a guideway 100 in the underside of and transverse of the tool carriage 86.

It will be seen that upon the rotation of the driving shaft 2 the shaft 91 will be driven at one-half the speed of the driving shaft 2, and the crank 97 through the yoke connection formed by the guideway 100 will reciprocate the tool carriage 86 transversely of the carrier 79. The crank 97 is set upon the shaft 91 and the whole driving mechanism is timed to affect that half of the reciprocating movement of the tool carriage 86 lying nearest the stock guide D during the travel of the carrier 79 in the direction of the travel of the stock F, that is, the tool carriage 86 should carry the tool toward the stock incising the same and back, withdrawing the said tools from the stock during one-half revolution of the shaft 91 and during the movement of the carrier 79 with the stock.

The tools 88 are set at a distance between their centers equal to the distance between the centers of incisions made by two of the tools 48 upon the rotary cutter, and the mechanism is timed to bring the tools 88 into exact registry with incisions previously made by the tools 48 upon the rotary cutter thereby effecting the complete carving of the contour of ornaments upon this moving stock by the co-action of the tools 48 and 88. The amount of the moving stock operated upon at one incision of the tools 88 is equivalent to the distance traveled by the stock during the return movement of the carrier 79, therefore, the tools 88 will continue the ornamentation of the moving stock upon their second contact with said stock at the point where they left off in their previous operation &c.

When it is desired to change the distance between the ornamental figures upon the stock, that is, to make the ornaments closer or farther apart than that described and illustrated, the cutter head 47 is replaced by another cutter head for the tools the required distance apart, and the tools 88 on the carriage 86 are clamped thereon the required distance apart. The adjustable crank 82 is adjustable by means of a spacing block of requisite thickness and the screw 74 to alter the length of the diametral travel of said adjustable crank 82, and the change gears are replaced by others to produce the feed corresponding with the altered diametral stroke of the adjustable crank 82.

The variable transmitting mechanisms when once set need not be changed again in adjusting the machines to different classes of work. The presser rolls may at any time be replaced by others having differently conformed peripheries to conform with stock of different profile. The stock guide D may also be replaced by another accommodating differently configured stock. The tools both in the rotary cutter and upon the carriage 86 may be replaced with other tools to produce different ornaments &c.

Access may be had to the interior of the frame A through a door G for the purpose of setting the variable speed transmitting devices.

The carrier 79 at all times in its movement completely covers all apertures leading to the interior of the frame A thus preventing any dust or chips from entering said frame. A plate H is bolted to the frame A and forms a closure for the highest part of said frame which, when removed, gives access to the feed roll and rotary cutter gearing and admits of the mounting and adjustment of said gears.

It is obvious that various changes in the tools, construction and design of my complete machine and of the various parts thereof may be made within the scope and spirit of my invention, and it is also obvious that parts of my device may be employed in other machines for the same or other purposes. I do not wish to confine the scope of my invention and the protection to be had thereon to the particular class of machine shown, but aim to embrace within the spirit of Letters Patent to be granted upon this application the employment of the organization by which I have produced the present improved device and the equivalents thereof.

The feature of the knives traveling coincidently with the stock-feed during the cutting movement is claimed in my copending application, Serial #98,948, filed March 19th, 1902.

The broad combination of a variable stock feed and a tool carriage traveling parallel to and coincident to the stock feed, and also toward and from the stock feed, is not claimed herein; but claims to such effect are contained in my application Serial No. 98,948, filed March 19, 1902.

What I claim is:—

1. In a carving-machine, the combination with a driving member, of a rotary cutter, a speed-varying transmitting device operatively connecting said driving member and said rotary cutter for imparting to said rotary cutter the development of the variable motion from said speed-varying transmitting device, a cutter-carrying reciprocating member, a speed-varying transmitting device operatively connecting said cutter-carrying reciprocating member and said driving member to impart the variable movement from said speed-varying transmitting device diametally to said cutter-carrying reciprocating member, all organized to effect substantially coincident velocities of the active periphery of said rotary cutter and of said cutter-carrying reciprocating member during the advance of said cutter-carrying reciprocating member.

2. In a carving-machine, the combination with a driving member, of a rotary cutter, a speed-varying transmitting device and change-gears operatively connecting said driving member and said rotary cutter to impart to said rotary cutter the development of the varying movement from said speed-varying transmitting device, a cutter-carrying reciprocating member, a speed-varying transmitting device, and an adjustable crank-and-yoke connection operatively connecting said cutter-carrying reciprocating member and said driving member, all organized to effect substantially coincident velocities of the active periphery of said rotary cutter and of said cutter-carrying reciprocating member during the advance of said cutter-carrying reciprocating member, said change-gears and said adjustable crank co-active to vary the extent of said substantially coincident movement.

3. In a carving-machine, the combination with a driving member, of a feed-roll, a speed-varying transmitting device and change-gears operatively connecting said driving member and said feed-roll, a reciprocating tool-carrier, a speed-varying transmitting device, and an adjustable crank-and-yoke connection operatively connecting said driving member and said reciprocating tool-carrier, all organized to effect substantially coincident varying velocities of the active periphery of said feed-roll and said tool-carrier during the advance of said tool-carrier, said change-gears and said adjustable crank coactive to vary, at will, the extent of said substantially coincident movement.

4. In a carving machine, the combination with a driving member, of a feed roll, eccentrically mounted engaging cranks forming a speed varying transmitting connection between said driving member and said feed roll for imparting to said feed roll the development of the variable motion from said engaging cranks and a reciprocative tool carrier whose speed during its forward movement coincides with the concurrent speed of the active periphery of said feed roll.

5. In a carving machine, the combination with a driving member of a feed roll, eccentrically mounted engaging cranks forming a transmitting connection between said driving member and said feed roll for imparting to said feed roll the development of the variable motion from said engaging cranks, a cutter carrying reciprocating member, eccentrically mounted engaging cranks driven from said driving member, and a crank and yoke connection between said engaging cranks and said cutter carrying reciprocating member for imparting the diametral movement of the variable motion from said engaging cranks to said cutter carrying reciprocating member to reciprocate the same, all organized to effect substantially coincident velocities in the active periphery of said feed roll and of said cutter carrying reciprocating member during the advance of said cutter carrying reciprocating member.

6. In a carving machine, the combination with a driving shaft, of a stud, a sleeve rotatably mounted upon said stud, a driving gear fast on said driving shaft, a driven gear fast on said sleeve, a crank fast on said sleeve, a driven shaft mounted parallel with and in a bore in and eccentric to the axis of said stud, a crank on said driven shaft engaged by said first mentioned crank, a feed roll driven from said driven shaft and a reciprocative tool carrier whose speed during its forward movement coincides with the concurrent speed of the development of said feed roll.

7. In a carving machine, the combination with a driving shaft, of a stud, a driving gear fast on said driving shaft, a gear fast on said sleeve meshing with and driven from said first mentioned gear, a driven shaft mounted parallel with and in a bore in and eccentric to the axis of said stud, a crank fast on said sleeve, a wrist pin carried by said crank, a second crank fast on said driven shaft, a radial guideway in said second crank engaged by said wrist pin, a feed roll driven from said driven shaft and a reciprocative tool carrier whose speed during its forward movement coincides with the concurrent speed of the development of said feed roll.

8. In a carving machine, the combination with a driving shaft, of a stud, a driving gear fast on said driving shaft, a sleeve rotatably mounted upon said stud, a driven gear fast on said sleeve and meshing with said driving gear, a crank fast on said sleeve, a driven shaft mounted parallel with and in a bore in and eccentric to the axis of said stud, a second crank fast on said driven shaft and engaged by said first mentioned crank, means for adjusting said second crank angularly upon said driven shaft, a feed roll driven from said driven shaft and a reciprocative tool carrier whose speed during its forward movement coincides with the concurrent speed of the development of said feed roll.

9. In a carving machine, the combination with a driving shaft, of a stud, a driving gear fast upon said driving shaft, a sleeve mounted to rotate upon said stud, a driven gear fast upon said sleeve and meshing with said driving gear, a crank fast upon said sleeve, a driven shaft mounted parallel with and in a bore in and eccentric to the axis of said stud, a crank mounted fast upon said driven shaft and engaged by said crank upon said sleeve, a feed roll a driving connection including change gearing for varying the ratio of revolution between said driving shaft and said feed roll and a reciprocative tool carrier whose speed during its forward movement coincides with the concurrent speed of the development of said feed roll.

10. In a carving machine, the combination with a driving shaft, of a stud, a driving gear fast on said driving shaft, a sleeve mounted to rotate upon said stud, a driven gear on said sleeve and meshing with said driving gear, a crank fast upon said sleeve, a driven shaft mounted parallel with and in a bore in and eccentric to the axis of said stud, a second crank fast upon said driven shaft and engaged by said first crank, a feed roll a third crank fast upon said driven shaft, a carrier reciprocatable transversely of said driven shaft, a wrist pin carried by said third crank, and a yoke upon said carrier engaged by said wrist pin, for varying the ratio of revolution between said driving shaft and said feed roll.

11. In a carving machine, the combination with a driving shaft, of a stud, a sleeve mounted to rotate upon said stud, a driving gear fast upon said driving shaft, a driven gear fast upon said sleeve, a crank fast upon said sleeve, a driven shaft mounted parallel with and in a bore in and eccentric to the axis of said stud, a second crank fast upon the said driven shaft and engaged by said first crank, a feed roll an adjustable throw crank fast upon said driven shaft, a wrist pin upon said adjustable throw crank, a carrier reciprocatable transversely of said driven shaft, and a yoke upon said carrier engaged by said wrist pin, for varying the ratio of revolution between said driving shaft and said feed roll.

12. In a carving machine, the combination with a driving shaft, of a stud, a sleeve mounted to rotate upon said stud, a driving gear fast upon said driving shaft, a driven gear fast upon said sleeve, a crank fast upon said sleeve, a driven shaft mounted parallel with and in a bore in and eccentric to the axis of said stud, a second crank fast upon said driven shaft and engaged by said first crank, a feed roll a means of angular adjustment for said second crank upon said driven shaft, a third crank fast upon said driven shaft, a wrist pin carried by said third crank, a carrier reciprocatable transversely of said driven shaft, and a yoke upon said carrier engaged by said wrist pin, for varying the ratio of revolution between said driving shaft and said feed roll.

13. In a carving machine, the combination with a driving shaft, of a stud, a sleeve mounted to rotate upon said stud, a driving gear fast upon said driving shaft, a driven gear fast upon said sleeve, a crank fast upon said sleeve, a wrist pin carried by said crank, a driven shaft mounted parallel with and in a bore in and eccentric with the axis of said stud, a second crank fast upon said driven shaft, a feed roll a radial guideway in said second crank engaged by said wrist pin, a third crank fast upon said driven shaft, a carrier reciprocatable transversely of said driven shaft, and a yoke upon said carrier engaged by said wrist pin upon said third crank, for varying the ratio of revolution between said driving shaft and said feed roll.

14. In a carving machine, the combination with a tool carrier driving mechanism, of a speed varying device consisting of a stud, a sleeve mounted to rotate upon said stud, of a crank fast upon said stud, a driven shaft mounted parallel with and in a bore in and eccentric to the axis of said stud, and a second crank fast upon said driven shaft and engaged by said first crank.

15. In a carving machine, the combination with a tool carrier driving mechanism, of a speed varying device consisting of a stud, a sleeve mounted to rotate upon said stud, a gear on and integral with said sleeve, a crank on and integral with said crank, a driven shaft mounted parallel with and in a bore in and eccentric to the axis of said stud, and a second crank fast upon said driven shaft and engaging with said first crank.

16. In a carving machine, the combination with a tool carrier driving mechanism, of a speed varying device consisting of a stud, a sleeve mounted to rotate upon said stud, a gear on and integral with said sleeve, a crank on and integral with said sleeve, a wrist pin carried by said crank, a second crank fast upon said driven shaft, a driven shaft mounted parallel with and in a bore in and eccentric to the axis of said stud, and a radial guideway in said second crank engaged by said wrist pin on said first crank.

17. In a carving machine, the combination with a feed roll driving mechanism, of a speed varying device consisting of a stud, a sleeve mounted to rotate upon said stud, of a crank fast upon said stud, a driven shaft mounted parallel with and in a bore in and eccentric to the axis of said stud, a second crank fast upon said driven shaft and engaged by said first crank and a reciprocative tool carrier whose speed during its forward movement coincides with the concurrent speed of the development of said feed roll.

18. In a carving machine, the combination with a feed roll driving mechanism, of a speed varying device consisting of a stud, a sleeve mounted to rotate upon said stud, a gear on and integral with said sleeve, a crank on and integral with said crank, a driven shaft mounted parallel with and in a bore in and eccentric to the axis of said stud, a second crank fast upon said driven shaft and engaging with said first crank and a reciprocative tool carrier whose speed during its forward movement coincides with the concurrent speed of the development of said feed roll.

19. In a carving machine, the combination with a feed roll driving mechanism, of a speed varying device consisting of a stud, a sleeve mounted to rotate upon said stud, a gear on and integral with said sleeve, a crank on and integral with said sleeve, a wrist pin carried by said crank, a second crank fast upon said driven shaft, a driven shaft mounted parallel with and in a bore in and eccentric to the axis of said stud, a radial guideway in said second crank engaged by said wrist pin on said first crank and a reciprocative tool carrier whose speed during its forward movement coincides with the concurrent speed of the development of said feed roll.

20. In a carving machine, the combination with tool carrier operating mechanism, of an apertured frame, a stud, a crank rotatably mounted on said stud, an enlarged portion upon said stud adapted to fit the aperture in said frame, a flange upon said stud, adapted to overlap said frame adjacent to said aperture and be bolted thereto, and a shaft bearing parallel to and whose axis is at one side of the axis of and supported by said stud.

21. In a carving machine, the combination with tool carrier operating mechanism, of an apertured frame, a stud, a crank rotatably mounted on said stud an enlarged portion upon said stud adapted to fit the aperture in said frame, a flange upon said stud, adapted to overlap said frame adjacent to said aperture and be bolted thereto, and a shaft bearing in and parallel to said stud and eccentric to the axis of said stud.

22. In a carving machine, the combination with feed roll and tool carrier operating mechanisms, of an apertured frame; a stud comprised in each mechanism; a crank rotatably mounted on each stud an enlarged portion upon each stud adapted to fit an aperture in said frame; a flange upon each stud adapted to overlap said frame adjacent to the aperture and be bolted to the frame; and a shaft-bearing in and whose axis is parallel to the axis of each stud, said bearing being located at one side of the axis of the stud.

23. In a carving machine, the combination with a rotary cutter operating mechanism, of an apertured frame, a stud, a crank rotatably mounted on said stud an enlarged portion upon said stud adapted to fit the aperture in said frame, a flange upon said stud adapted to overlap said frame adjacent to said aperture and be bolted thereto, and a shaft-bearing in said stud parallel and eccentric to the axis of said stud.

24. In a carving machine, the combination with feed roll and rotary cutter operating mechanism, of an apertured frame, a stud, a crank rotatably mounted on said stud an enlarged portion upon said stud adapted to fit the aperture in said frame, a flange upon said stud adapted to overlap said frame adjacent to said aperture and be bolted thereto, and a shaft-bearing in said stud and parallel and eccentric to the axis of said stud.

25. In a carving machine, the combination of a driving shaft, a reciprocatable carrier, a variable stock-feed a tool carriage mounted upon said carrier to reciprocate transversely thereof, operative connection between said driving shaft and said carriage for reciprocating the latter, a yoke upon said tool carriage transverse of said tool carriage and lengthwise of said carrier, and a crank driven from said driving shaft operatively engaging said yoke.

26. In a carving machine, a carrier, a variable stock-feed a yoke upon said carrier consisting of a slot transverse thereof, an adjustable driving crank engaging said yoke and a closure for said slot at the opposite side thereof to that from which the said crank engages, the removal of which closure permits of access through said slot to adjust said crank.

27. In a carving machine, the combination of a stock guide, a rotary cutter rotatable in the plane of said stock guide, a carrier rotatable parallelly of said stock guide, a tool carriage mounted upon said carrier and reciprocatable transversely of said stock guide, and mechanism operatively connected to said rotary cutter carrier and tool carriage for effecting variable speed movement in said rotary cutter and carrier, and a normal reciprocation from a uniformly rotating crank in said tool carriage.

28. In a carving machine, the combination with a driving member, of a crank driven by said driving member, a second crank eccentrically mounted to and rotated by said first crank, a carrier reciprocated from said second crank, a third crank driven from said driving member, a fourth crank eccentrically mounted to and rotated by said third crank, and a feed roll driven from said fourth crank all organized to effect velocities in forward movement of said carrier substantially equivalent to the concurrent peripheral velocities of said feed roll.

FRANCIS H. RICHARDS.

Witnesses:
JOHN O. SEIFERT,
MARCUS C. HOPKINS.